United States Patent [19]

Kuno et al.

[11] Patent Number: 4,497,034

[45] Date of Patent: Jan. 29, 1985

[54] HEADING DETECTING APPARATUS

[75] Inventors: Akira Kuno, Oobu; Muneaki Matsumoto, Okazaki; Koji Numata, Toyokawa, all of Japan

[73] Assignee: Nippon Soken, Inc., Nishio, Japan

[21] Appl. No.: 355,622

[22] Filed: Mar. 8, 1982

[30] Foreign Application Priority Data

Aug. 5, 1981 [JP] Japan .................. 56-123370
Aug. 8, 1981 [JP] Japan .................. 56-124432
Aug. 24, 1981 [JP] Japan .................. 56-133090

[51] Int. Cl.³ .............................................. G01P 21/00
[52] U.S. Cl. ..................................... 364/571; 33/361; 324/353; 364/444; 364/559
[58] Field of Search ............... 364/424, 457, 443, 444, 364/436, 449, 453, 460, 559, 571; 340/23, 24, 27 NA; 324/244, 247, 253, 245, 254, 255; 73/178; 33/361, 356

[56] References Cited

U.S. PATENT DOCUMENTS 3,873,914  3/1975  Kesselring ...................... 324/247
3,991,361  11/1976  Mattern et al. ...................... 324/244
4,262,427  4/1981  Lynch et al. ...................... 33/356 X
4,367,453  1/1983  Kuno et al. ...................... 364/424 X
4,399,615  8/1983  Matsumoto et al. ............ 324/244 X Primary Examiner—Errol A. Krass
Assistant Examiner—Edward R. Cosimano
Attorney, Agent, or Firm—Cushman, Darby & Cushman

[57] ABSTRACT

A heading detecting apparatus is attached to a moving object and includes a geomagnetic field sensor for detecting the direction of the earth's magnetic field in terms of orthogonal first and second signals and a computing circuit responsive to orthogonal first and second electric signals from the geomagnetic field sensor. In the computing circuit, when any one of the orthogonal first and second electric signals from the geomagnetic field sensor is a predetermined value, the value of the other electric signal is detected so that in accordance with the detected value an offset value is computed and stored, and the electric signals from the geomagnetic field sensor is corrected in accordance with the offset values.

9 Claims, 10 Drawing Figures

HEADING DETECTING APPARATUS

BACKGROUND OF THE INVENTION

The present invention relates to a heading detecting apparatus in which a heading signal, corresponding to the direction of travel of a moving object such as an automotive vehicle, is generated in response to the signals from a geomagnetic field sensor.

With heading detecting apparatuses heretofore known in the art, any offsets of the earth's magnetic field due to the remanence of a vehicle or the like are compensated for by compensating magnets which are mounted externally on the vehicle.

With this construction, it is necessary to consider a number of other aspects, such as the location, number and intensity of the compensating magnets mounted externally for cancellation of any offsets of the earth's magnetic field due to the remanence of the vehicle thus complicating the compensation, and moreover this compensation must be different for different vehicles due to variations in their geomagnetic field offset characteristics. Further, the signals from the geomagnetic field sensor themselves are sometimes offset making it difficult to accurately detect the direction of the earth's magnetic field.

SUMMARY OF THE INVENTION

With a view to overcoming the foregoing deficiencies in the prior art, it is the primary object of the present invention to provide a heading detecting apparatus in which when any one of two orthogonal component electric signals from a geomagnetic field sensor attain a predetermined value, the value of the other electric signal is detected and the amount of an offset is computed and memorized in accordance with the detected value, thereby correcting the electric signals from the geomagnetic field sensor in accordance with the offsets and thereby generating a heading signal corresponding to the accurate direction of travel of a moving object.

It is another object of the invention to provide, in accordance with a preferred embodiment, a heading detecting apparatus in which during the operation of a moving object, any instantaneous abnormal values are eliminated from the two orthogonal component electric signals from a geomagnetic field sensor so that when the electric signals having the abnormal values are eliminated therefrom they attain a predetermined condition, the amounts of offset of the electric signals are computed and memorized and the electric signals from the geomagnetic field sensor having the abnormal values eliminated are corrected for in accordance with the offsets, thereby generating a heading signal corresponding to the accurate direction of travel of the moving object without being affected by any instantaneous irregularity of the electric signals due to any disturbance of the earth's magnetic field and also considering the change with time of the offset of the earth's magnetic field.

It is still another object of the invention to provide, in accordance with another preferred embodiment, a heading detecting apparatus in which in accordance with three arbitrary sets of values of the two orthogonal component electric signals from a geomagnetic field sensor, the amounts of offset of a circular vector locus by the two orthogonal component electric signals are computed and memorized at predetermined time intervals and the electric signals from the geomagnetic field sensor are always corrected for in accordance with the amounts of offset, thus generating a heading signal corresponding to the accurate direction of travel of a moving object without being affected by any offset of the earth's magnetic field due to the remanence of the moving object or the like and the change of the offsets with time.

DESCRIPTION OF THE PREFERRED EMBODIMENTS

The present invention will now be described in greater detail with reference to the illustrated embodiments.

Figure 1:
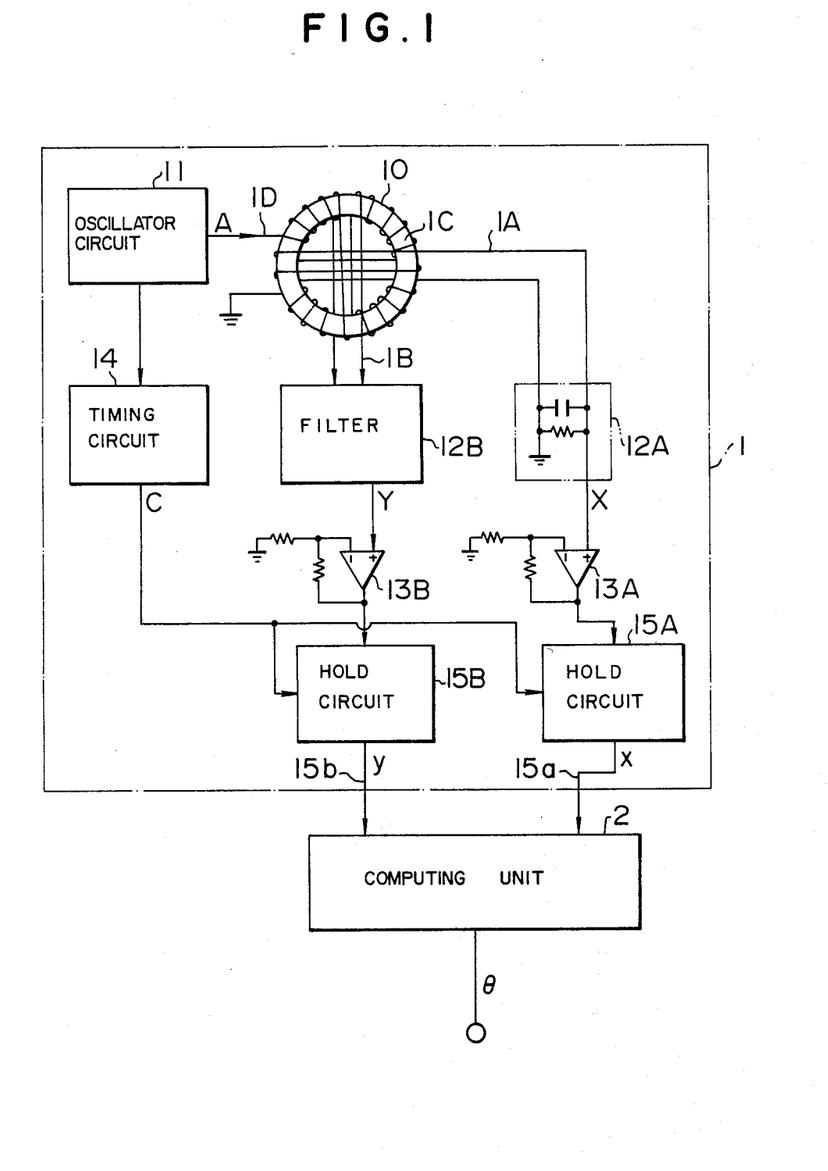
FIG. 1 is a wiring diagram showing an embodiment of the present invention.
Figure 2:
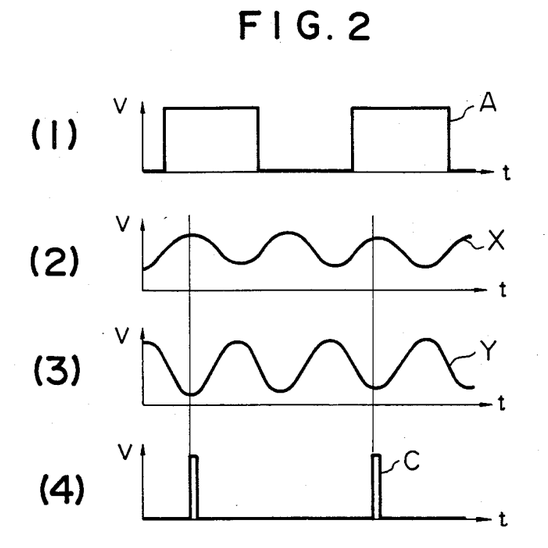
FIG. 2 shows a plurality of voltage waveforms useful for explaining the operation of a geomagnetic field sensor.

Referring to FIG. 1 illustrating a wiring diagram showing a first embodiment of the invention, a heading detector circuit 10 comprises a magnetic core 1C made on a ferromagnetic material, an exciting winding 1D wound on the core 1C and output windings 1A and 1B which are wound on the core 1C to cross each other at right angles. Numeral 11 designates an oscillator circuit for generating a rectangular signal A, shown in FIG. 2(1) to drive the excitation winding 1D at a frequency f. The magnetic field in the core 1C varies in accordance with the sum (H+b) of the horizontal component H of the earth's magnetic field and the horizontal component h of the offset of the earth's magnetic field applied to the heading detector circuit 10, so that each of the output windings 1A and 1B generates an output proportional to the magnetic field in the core 1C and filters 12A and 12B of the same construction, comprising a capacitor and a resistor, generate respectively output X and Y of the same frequency 2f component as shown in FIG. 2(2) and (3). After the outputs X and Y have been amplified, respectively, by amplifier circuit 13A and 13B, the outputs X and Y are, respectively, sampled and held by hold circuits 15A and 15B in response to a signal C generated from a timing circuit 14, as shown in FIG. 2(4) and the resulting dc outputs x and y are, respectively, generated at points 15a and 15b.

Figure 3:
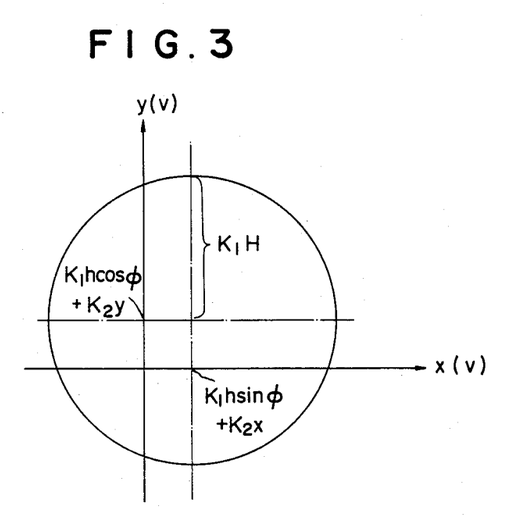
FIG. 3 is a diagram useful for explaining the operation of the geomagnetic field sensor.

If the horizontal component H of the earth's magnetic field is applied at an angle $\theta$ and the horizontal component h of the offset of the earth's magnetic field is applied at an angle $\Phi$, respectively, with respect to the output winding 1B, the resulting outputs x and y are given by the following equations $$x = K_1 (H \sin \theta + h \sin \Phi) + K_2x$$

$$y = K_1 (H \cos \theta + h \cos \Phi) + K_2y$$

where $K_1$ is the amplification factor of the geomagnetic field sensor 1, and $K_2x$ and $K_2y$ are the offsets of the geomagnetic field sensor 1. Then, if the vehicle or the angle $\theta$ is rotated through 360°, the vector loci of the outputs x and y (the points 15a and 15b) of the geomagnetic field sensor 1 describe a circle of a radius $K_1H$ having the origin moved by $K_1h \sin \Phi + K_2x$ in the x-axis direction and by $K_1h \cos \Phi + K_2y$ in the y-axis direction, as shown in FIG. 3.

Figure 4:
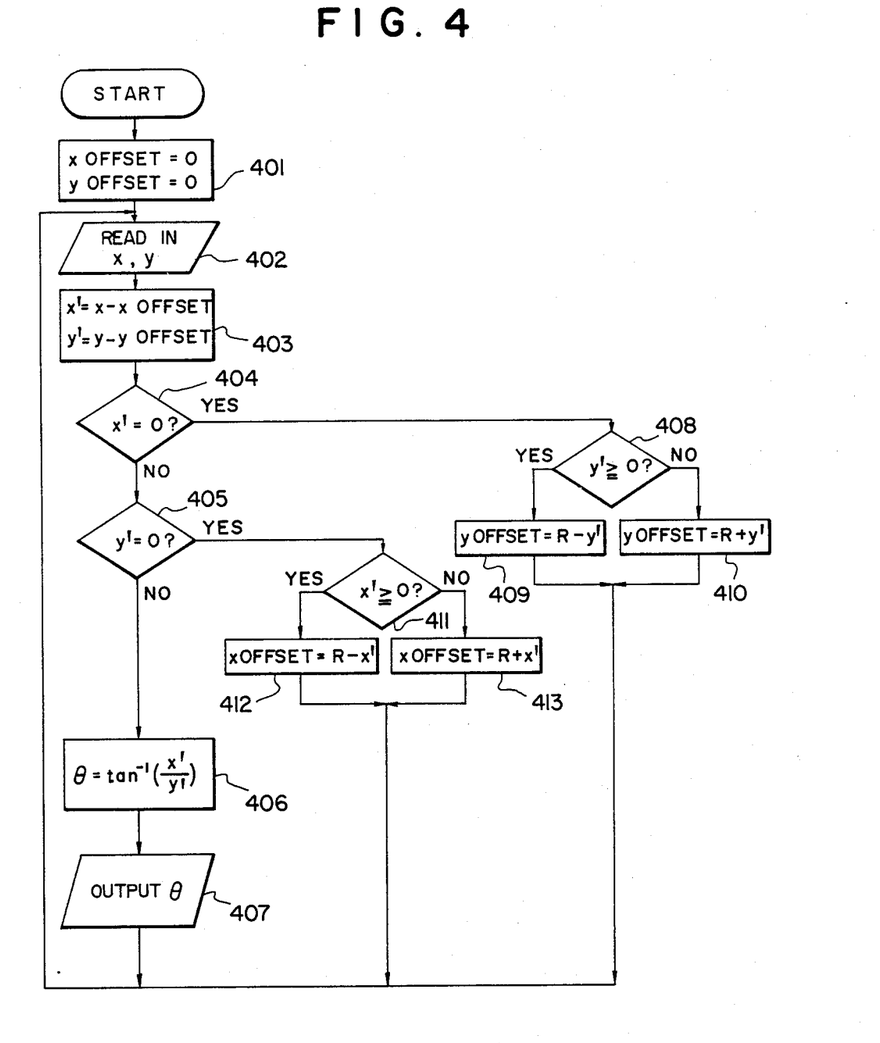
FIG. 4 is a computing flow chart showing the computational operations of a computing unit.
Figure 5:
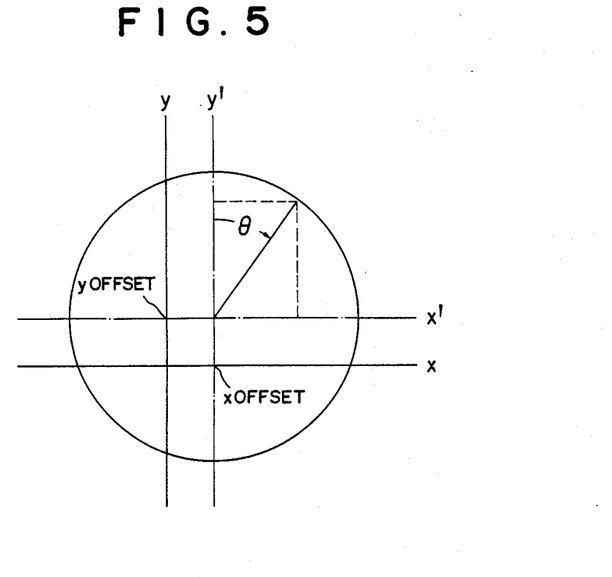
FIG. 5 is a diagram useful for explaining the computational operations of the computing unit.

Referring again to FIG. 1, numeral 2 designates a computing unit comprising a known type of microcomputer system to perform the computational operations shown in FIG. 4. Firstly, the outputs x and y of the geomagnetic field sensor 1 are read in by a step 402 and the amounts of movement of the origin x offset and y offset (the initial values are made zero by a step 401) are respectively subtracted by a step 403 from the outputs x and y thereby obtaining x' and y'. When a step 404 and a step 405 decide that any one of the values x' and y' is zero, steps 408 to 410 or steps 411 to 413 compute, in accordance with the other y' or x' and a constant R corresponding to the radius $K_1H$ of the vector loci of the outputs x and y from the geomagnetic field sensor 1 the origin movement $y_{offset}$ or $x_{offset}$ and the computed value is stored. (This storage is effected irrespective of the operating conditions of the vehicle.) In other words, in response to the value of x or y which is preselected to provide x=0 or y=0 the computation of the origin movement $y_{offset}$ or $x_{offset}$ is repeatedly effected several times so that the origin movements ($K_1h \sin \Phi + K_2x$) and ($K_1h \cos \Phi + K_2y$) shown in FIG. 3 are obtained as the offset amounts or the origin movements $x_{offset}$ and $y_{offset}$ shown in FIG. 5.

When the steps 404 and 405 decide that the outputs x' and y' are not zero, the computation of $\theta = \tan^{-1}(x'/y')$ is effected by a step 406 in accordance with these x' and y' and thus a heading signal $\theta$ corresponding to the direction of travel of the vehicle is generated by a step 407.

The heading detecting apparatus including the computing unit 2 becomes operational in response to the closing of a power supply switch exclusively used by the apparatus (or by closing the vehicle ignition key switch), and also the offset amounts are stored in a memory (nonvolatile memory) irrespective of the turning on and off of the power supply switch.

While, in the above-described first embodiment, the heading detector circuit 10 comprises a ring core type flux gate sensor, this may be replaced with any other type of flux gate sensor, Hall generator or the like.

Further, the heading signal $\theta$ is not limited to the computation of $\tan^{-1}(x'/y')$ and it may also be obtained by 2N division through level comparision.

Still further, the computing unit 2 is not limited to the digital processing by a microcomputer system and it may also be realized by analog processing through a combination of comparator circuits, adder/subtractor circuits, etc.

Still further, the heading detecting apparatus of this invention is not limited to vehicles and it is also applicable to ships, aircrafts and other measuring apparatuses. Still further, while the above-described embodiment is arranged such that when any one of x' and y' is zero the computation is effected by using the other y' or x', it is also possible to arrange the invention such that when any one of x' and y' attains a predetermined value which is not zero the value of the other y' or x' is utilized.

A second embodiment of this invention will now be described with reference to FIG. 1. Where the horizontal component H of the earth's magnetic field is applied at an angle $\theta$ and the horizontal component h of the offset of the earth's magnetic field is applied at an angle $\theta$, respectively, with respect to the output winding 1B, the resulting outputs x and y are given by the following equations:

$$x = K_1(H \sin \theta + h \sin \Phi) + K_2x$$

$$y = K_1(h \cos \theta + h \cos \Phi) + K_2y$$

In these equations, $K_1$ is the amplification factor of the geomagnetic field sensor 1 and $K_2x$ and $K_2y$ are the offsets of the geomagnetic field sensor 1. Then if the vehicle or the angle $\theta$ is rotated through 360°, the vector loci of the outputs x and y (the points 15a and 15b) of the geomagnetic field sensor 1 describe a circle of a radius $K_1H$ and having the origin respectively moved by $K_1h \sin \Phi + K_2x$ in the x-axis direction and by $K_1h \cos \Phi + K_2y$ in the y-direction as shown in FIG. 3.

Figure 6:
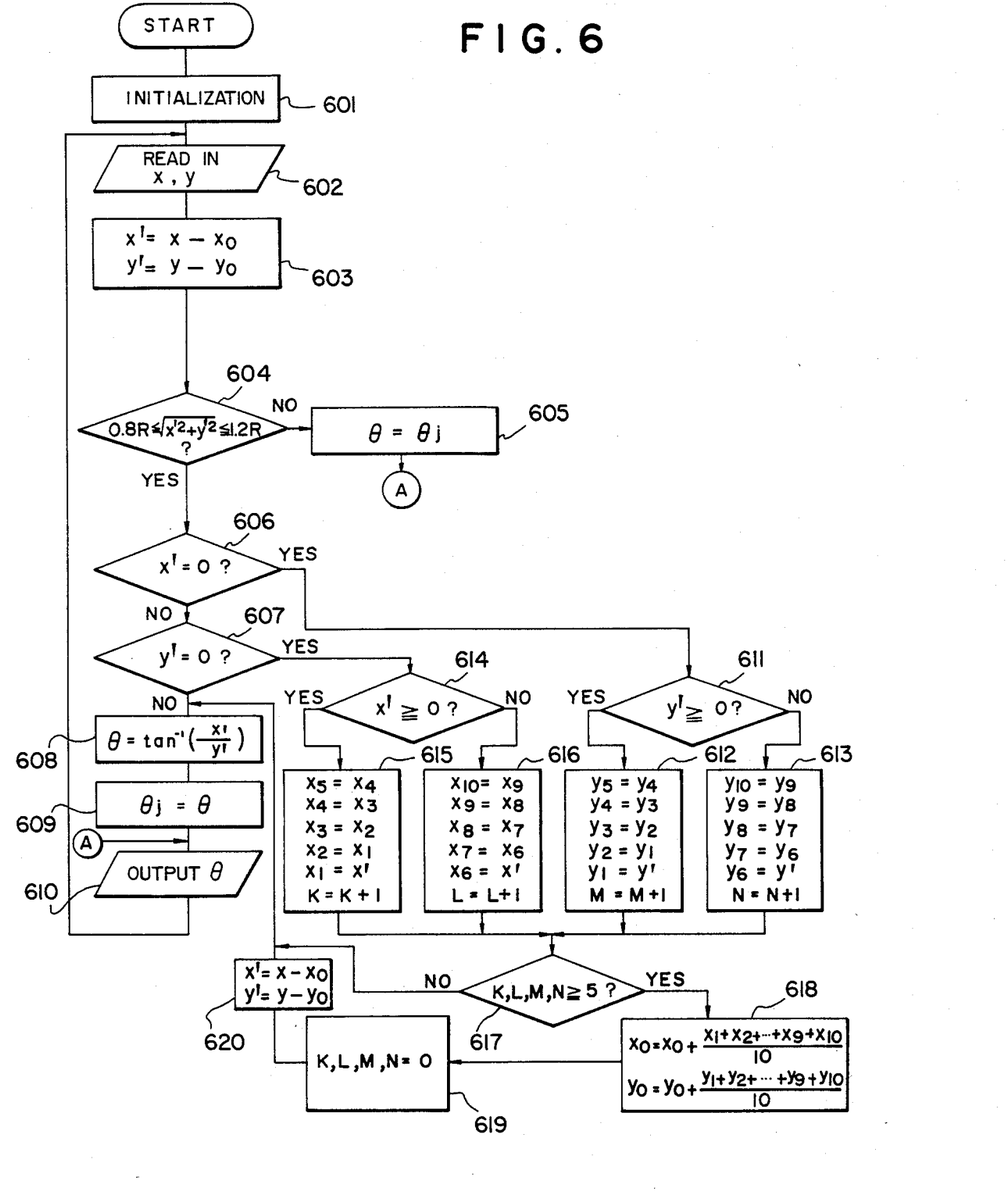
FIG. 6 is a computing flow chart showing the computational operations of the computing unit.

In FIG. 1, the computing unit 2 comprising a known type of microcomputer system performs the computational operations shown in FIG. 6.

Firstly, the initial values of the variable are set to zero by an initialization step 601. Then, the output x and y of the geomagnetic field sensor 1 are read in by a step 602 and the origin movements (the offset amounts) $x_0$ and $y_0$ are subtracted by a step 603 from the outputs x and y there obtaining x' and y'. Then, the computation of $\sqrt{x'^2 + y'^2}$ is performed by a step 604 so that if the resulting value is outside the range from 0.8 to 1.2R (R is a constant corresponding to $K_1H$ in FIG. 3), it is determined by a step 605 that the outputs of the geomagnetic field sensor 1 are abnormal values and thus the just preceding heading signal $\theta j$ is held and outputted without performing the following computational processing of the output offset amounts of the geomagnetic field sensor 1 and heading signal computation.

Figure 7:
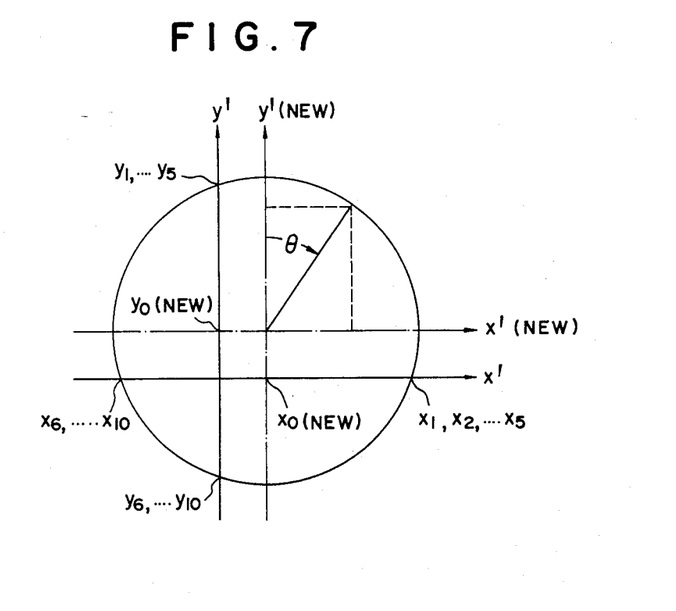
FIG. 7 is a diagram useful for explaining the operation of the computing unit.

The computational processing of the output offset amounts of the geomagnetic field sensor 1 is performed so that when a step 606 and a step 607 decide that one of x' and y' is zero, the values of the other x' or y' are stored by steps 614 to 616 or steps 611 to 613 as positive and negative values, respectively. When the number of each of the positive and negative data of x' and y' becomes greater than 5 in number by a step 617, the average of the ten data of x' and y', respectively, is obtained and the resulting average values are added by a step 618 to the previous $x_0$ and $y_0$ thereby obtaining new origin movements (offset amounts) $x_0$ and $y_0$. In other words, initially the origin movements ($K_1h \sin \Phi + k_2x$) and ($K_1h \cos \theta + K_2y$) shown in FIG. 3 are obtained as the origin movements (offset amounts) $x_0$ (NEW) and $y_0$ (NEW) shown in FIG. 7 and thereafter the origin movements (offset amounts) $x_0$ and $y_0$ are modified each time the origin movements ($K_1h \sin \Phi + K_2x$) and ($K_1h \cos \Phi + K_2y$) shown in FIG. 3 are varied.

Then, the outputs x and y of the geomagnetic field sensor 1 are corrected by steps 619 and 620 in accordance with the offset amounts $x_o$ and $y_0$ so that in accordance with the resulting x' and y' the computation of $\theta = \tan^{-1}(x'/y')$ is performed by a step 608 and a heading signal $\theta$ corresponding to the direction of travel of the vehicle is generated by steps 609 and 610.

The computing unit 2 is supplied wih power upon closing of the power supply switch of the heading detecting apparatus (or upon closing of the vehicle key switch) and the origin movements $x_0$ and $y_0$ and the respective offset amount computing ten-data sets of $x'$ and $y'$ are stored in a nonvolatile memory irrespective of the condition of the power supply switch.

While, in the above-described embodiment, the heading detector circuit 10 comprises a ring core type flux gate sensor, it may be replaced with any other type of flux gate sensor, Hall generator or the like.

Further, the heading signal $\theta$ needs not be computed according to $\theta = \tan^{-1}(x'/y')$ and it may be also obtained by 2N division through level comparison.

Further, the computing unit 2 is not limited to the digital processing by a microcomputer system and it can also be realized by analog processing through a combination of comparator circuits, adder/subtractor circuits, etc.

Still further, the heading detecting apparatus according to this embodiment is not limited to vehicles and it is also applicable to ships, aircrafts and other measuring apparatuses as well.

Still further, while the computational processing of offset amounts is effected in such a manner that when one of $x'$ and $y'$ is zero the computation is effected by using the other $y'$ or $x'$, it is also possible to arrange the invention so that when one of $x'$ and $y'$ attains a predetermined value which is not zero the value of the other $y'$ or $x'$ is utilized. Also, the computation of offset amounts can be effected similarly by using the outputs x and y (having the values within the normal range) of the geomagnetic field sensor 1.

Still further, the occurrence of any instantaneous abnormal values of the outputs of the geomagnetic field sensor 1 are determined when the value of $\sqrt{x'^2 + y'^2}$ is outside the range from 0.8 to 1.2R, the values 0.8 to 1.2R may be replaced by any arbitrary values. Still further, instead of the computation of $\sqrt{X'^2 + Y'^2}$, it is possible to determine the occurrence of any abnormal values when the difference in value between the preceding x and y, $x'$ and $y'$ or $\theta$ and the current x and y, $x'$ and $y'$ or $\theta$ is greater than a predetermined value.

Figure 8:
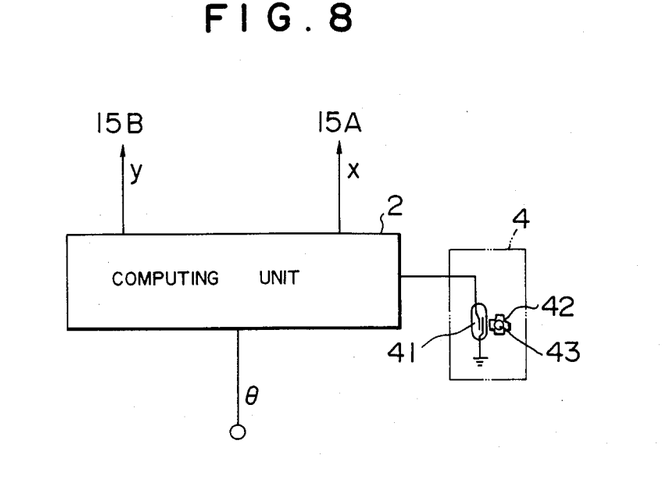
FIG. 8 is a wiring diagram showing another embodiment of the invention.

FIG. 8 is a partial electric circuit diagram showing a third embodiment of this invention and its remaining construction is identical with the counterpart in FIG. 1.

Where the horizontal component H of the earth's magnetic field is applied at an angle $\theta$ and the horizontal component h of the offset of the earth's magnetic field at an angle $\Phi$, respectively, with respect to the output winding 1B, the resulting outputs x and y are given by the following equations:

$$x = K_1(H \sin \theta + h \sin \Phi) + K_{2x}$$

$$y = K_1(H \cos \theta + h \cos \Phi) + K_{2y}.$$

In these equations, $K_1$ is the amplification factor of the geomagnetic field sensor 1 and $K_{2x}$ and $K_{2y}$ are the offsets of the geomagnetic field sensor 1. If the vehicle or the angle $\theta$ is rotated through 360°, the vector loci of the outputs x and y (the points 15a and 15b) from the geomagnetic field sensor 1 describe a circle having a radius $K_1H$ and having the origin moved by $K_1h \sin \Phi + K_{2x}$ in the x-axis direction and by $K_1h \cos \Phi + K_{2y}$ in the y-axis direction as shown by the solid line in FIG. 3.

In this case, if the amount of offset in the x-axis direction is represented as $x_0$ ($= K_1h \sin \Phi + K_{2x}$) and the amount of offset in the y-axis direction as $y_0$ ($= K_1H \cos \Phi + K_{2y}$), the offset amounts $x_0$ and $y_0$ or the center ($x_0$, $y_0$) of the circle having the radius $K_1H$ is varied due to variations in the offset of the earth's magnetic field caused by the remanence of the vehicle or the like. If the value of the center ($x_0$, $y_0$) of the circle is determined from the following equations, in accordance with the given three sets of values of the outputs x and y such as shown in FIG. 9, $$(K_1H)^2 = (x_1 - x_0)^2 + (y_1 - y_0)^2$$
$$= (x_2 - x_0)^2 + (y_2 - y_0)^2 = (x_3 x_0)^2 + (y_3 - y_0)^2$$

then the following results $$x_0 = \frac{(y_3 - y_2)\{(x_2 - x_1)(x_2 + x_1) + (y_2 - y_1)(y_2 + y_1) - (y_2 - y_1)\{(x_3 - x_2)(x_3 + x_2) + (y_3 - y_2)(y_3 + y_2)\}}{2\{(x_2 - x_1)(y_3 - y_2) - (x_3 - x_2)(y_2 - y_1)\}}$$

$$y_0 = \frac{(x_3 - x_2)(x_3 + x_2) + (y_3 - y_2)(y_3 + y_2) - 2(x_3 - x_2) \cdot x_0}{2(y_3 - y_2)}.$$

Figure 9:
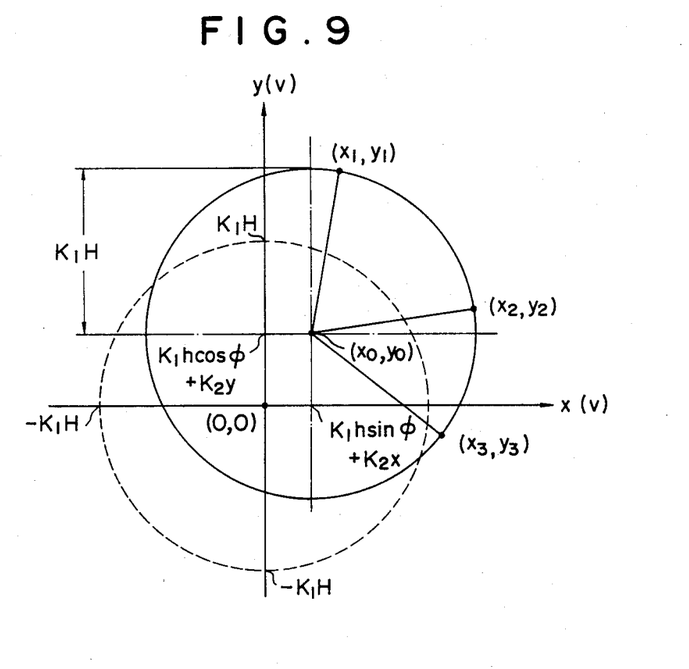
FIG. 9 is a diagram useful for explaining the operation of the geomagnetic field sensor and the computational operations of the computing unit.

Thus, in accordance with the given three sets of values $(x_1, y_1)$, $(x_2, y_2)$ and $(x_3, y_3)$ of the outputs x and y the offset amounts $x_0$ and $y_0$ are determined, and the vector loci with respect to $\theta$ of the values $x'$ ($= x - x_0$) and $y'$ ($= y - y_0$) resulting from the correction of the outputs x and y from the geomagnetic field sensor 1 describe a circle whose center is the origin as shown by the broken line in FIG. 9.

Figure 10:
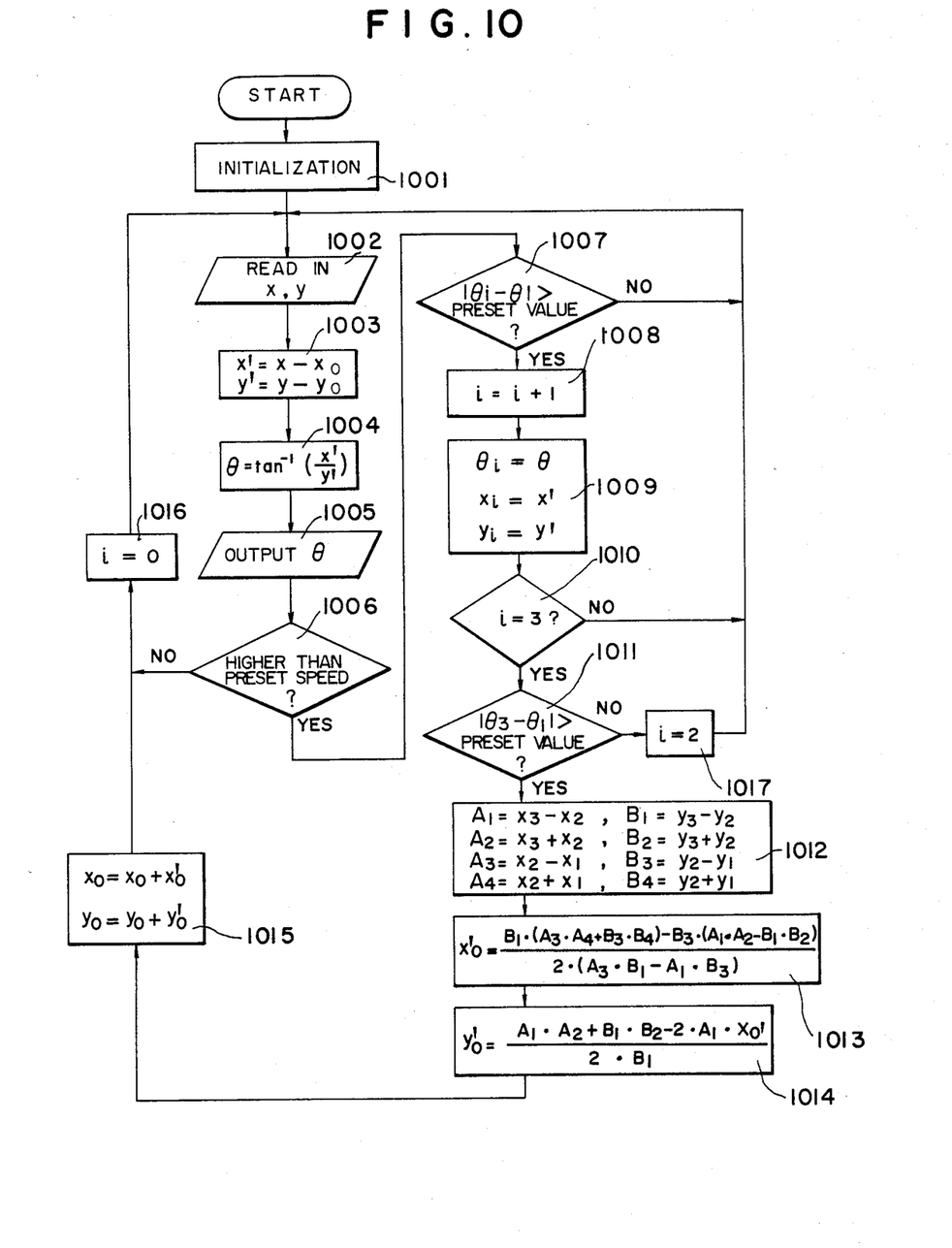
FIG. 10 is a computing flow chart showing the computational operations of the computing unit.

The computational operations shown in FIG. 10 are performed by the computing unit 2 of FIG. 1 which comprises a known type of microcomputer system. In accordance with the processing shown in FIG. 10, the outputs x and y of the geomagnetic field sensor 1 are read in by a step 1002 and the offset amounts $x_0$ and $y_0$ (the initial values are both made zero by a step 1001) are respectively subtracted by a step 1003 from the outputs x and y. In accordance with the resulting corrected values $x'$ ($= x - x_0$) and $y'$ ($= y - y_0$) the computation of $\theta = \tan^{-1}(x'/y')$ is effected by a step 1004 and a heading signal $\theta$ corresponding to the direction of travel of the vehicles is generated by a step 1005.

Then, a predetermined speed is compared with a vehicle speed derived from a vehicle speed signal from a vehicle speed sensor 4 comprising a rotary member 42 including a magnet operatively responsive to the rotation of a vehicle drive shaft 43 or the wheel and a reed switch 41 adapted to be opened and closed in response to the north and south poles of the rotary member 42 as shown in FIG. 8. Thus, when a step 1006 decides that the vehicle speed is higher than the predetermined speed (e.g., 50 Km/h) and the absolute value of the difference between $\theta_i$ (the initial value is zero) and the heading signal $\theta$ is greater than a predetermined value, the values of $x_0'$ and $y_0'$ are obtained by a step 1013 and a step 1014 in accordance with three sets of values of the corrected values $x'$ and $y'$ of the corresponding outputs x and y and they are then added to the preceding offset amounts $x_0$ and $y_0$ thereby obtaining and storing new offset amounts $x_0$ and $y_0$. After the new offset amounts $x_0$ and $y_0$ have been obtained, the offset amounts $x_0$ and $y_0$ are subtracted by the step 1003 from the outputs x and y of the geomagnetic field sensor 1 so that in accordance with the resulting corrected values x' and y' a heading signal $\theta$ corresponding to the direction of travel of the vehicle is obtained by the step 1004 and outputted by the step 1005.

More specifically, in the step 1006 a preset speed and an output speed of the vehicle sensor 4 in FIG. 8 are compared with each other. If the comparison is higher than the present speed, then the flow goes to the step 1007 and if not, then it goes to a step 1016 making a value i zero and returns to the step 1002.

In the step 1007, the absolute value of difference between the present direction signals $\theta$ and $\theta_i$ is compared with a preset value (for example 30°). If the difference is higher than the preset value, then the flow goes to a step 1008 and if not, then it returns to the step 1002. In the step 1007, the value i takes 0 or 2. The initial value i is set to zero and the initial value $\theta_0$ is set to more than 360° plus the preset value. Therefore, if the value i is zero, then the difference is always higher than the preset value because the value of the direction signal $\theta$ becomes 0 or 360°.

The heading detecting apparatus including the computing unit 2 is designed so that it becomes operational in response to closing of the power supply switch for the apparatus (or upon closing of the vehicle ignition key switch) and the offset amounts are stored in a nonvolatile memory irrespective of the turning on and off of the power supply switch.

While, in the above-described embodiment, the extraction of three sets of values $(x_1, y_1)$, $(x_2, y_2)$ and $(x_3, y_3)$ of the corrected values x' and y' of the outputs x and y from the geomagnetic field sensor 1 is effected on condition that the vehicle speed is higher than a predetermined value so as to prevent the extraction of any instantaneous abnormal values and that the vehicle rotation is higher than a predetermined value so as to improve the accuracy of computation of the offset amounts $x_0$ and $y_0$, it should be apparent that the extraction can be allowed only when $(x'^2+y'^2)$ of the values of the corrected values x' and y' is within a predetermined range as a means of preventing the extraction of instantaneous abnormal values.

Further, while, in the above-described embodiment, the values of $x_0'$ and $y_0'$ are obtained in accordance with the given three sets of values of the corrected values x' and y' and the thus obtained $x_0'$ and $Y_0'$ are added to the preceding offset amounts $x_0$ and $y_0$ to obtain new offset values $x_0$ and $y_0$, it is possible to obtain such new offset amounts $x_0$ and $y_0$ directly from the three sets of values of the outputs x and y generated when the speed and rotation of the vehicle are higher than the predetermined values.

Still further, while, in the above-described embodiment, the given three sets of values of the corrected values x' and y' are obtained when the speed and rotation of the vehicle are higher than the predetermined values, it is possible to arrange the invention so that when the vehicle speed exceeds a predetermined value and the values of the corresponding corrected value x' corresponds to any one of three predetermined values $x_1$, $x_2$ and $x_3$ (these values are separated by a suitable number from each other), the corresponding value of y' is stored and the desired offset amounts $x_0$ and $y_0$ are computed and stored when the corresponding values of y' to the three values $x_1$, $x_2$ and $x_3$ are all stored until a predetermined distance (e.g., 1 to 2 Km) is travelled. This is also applicable to the previously mentioned method of directly computing the desired offset amounts $x_0$ and $y_0$ from the value of y instead of y'.

Still further, while the computational operations for the updating of offset amounts $x_0$ and $y_0$ are performed when the vehicle is in operation, it is possible to install an offset detecting switch so that the vehicle is rotated at a place where the earth's magnetic field is normal and in accordance with the given three sets of outputs x and y from the geomagnetic field sensor 1 the computation of offset amounts $x_0$ and $y_0$ is performed.

Still further, it is possible to store a plurality of sets of values of x' and y' or x and y when the vehicle speed is higher than a predetermined value so that a plurality of offset amounts are computed in accordance with any selected three of the stored sets of values and the plurality of offset amounts are averaged to obtain the desired new offset values.

Still further, where the vector loci of the outputs x and y result in an ellipse and not a circle, the elliptic calculation formula may be used to effect the computation of the offset amounts.

Still further, while the geomagnetic field sensor 1 comprises a ring core type flux gate sensor, it may be replaced with any other type of flux gate sensor, Hall generator or the like.

Still further, the computation of a heading signal $\theta$ is not limited to the computation of $\tan^{-1}(x'/y')$ and the signal may be obtained by 2N division through level comparison.

Still further, the computing unit 2 is not limited to digital processing by a microcomputer system and it may also be realized by analog processing by a combination of comparator circuits, adder/subtractor circuits, etc.

Still further, the heading detecting apparatus of this embodiment is not limited to vehicles and it may be applied to ships, aircrafts and other measuring apparatuses.

We claim:

1. A heading detecting apparatus attached to a moving object and including a geomagnetic field sensor for detecting the direction of the earth's magnetic field in terms of two orthogonal components and a computing circuit responsive to orthogonal first and second electric signals from said geomagnetic field sensor to compute a heading of said moving object and generate a heading signal, wherein said computing circuit comprises:

means whereby when one of first and second output values (X', Y') respectively proportional to said orthogonal first and second electric signals (X, Y) attains a predetermined value, one of first and second offset values (X offset, Y offset) for the other of said first and second output values is repeatedly computed and stored; and means for repeatedly during operation of said apparatus correcting said electric signals from said geomagnetic field sensor in accordance with said offset values to derive said first and second output values for computing the heading signal of said moving object therefrom.

2. An apparatus according to claim 1, wherein said computing and storing means comprises:

first computing means for computing said first output value (X') by subtracting said first offset value (X offset, Xo) from said first electric signal output value (X) of said heading detecting circuit; and second computing means for computing said second output value (Y') by subtracting said second offset value (Y offset, Yo) from said second electric signal output value of said geomagnetic field sensor.

3. An apparatus according to claim 2, wherein said computing and storing means further comprises:

third computing means for detecting the time when said second output value (Y') is zero whereby when said first output value (X') is positive, said first output value (X') is subtracted from a predetermined constant (R) to compute said first offset value (X offset);

fourth computing means for detecting the time when said second output value (Y') is zero whereby when said first output value is negative, said first output value (X') is added to said predetermined constant (R) to compute said first offset value (X offset); and first memory means for storing said first offset value.

4. An apparatus according to claim 3, wherein said computing and storing means further comprises:

fifth computing means for detecting the time when said first output value (X') is zero whereby when said second output value (Y') is positive, said second output value (Y') is subtracted from said predetermined constant to compute said second offset value (Y offset);

sixth computing means for detecting the time when said first output value (X') is zero whereby when said second output value (Y') is negative, said second output value (Y') is added to said predetermined constant (R) to compute said second offset value (Y offset); and second memory means for storing said second offset value.

5. In a heading detecting apparatus attached to a moving object and comprising a geomagnetic field sensor for detecting the direction of the earth's magnetic field in terms of orthogonal first and second signals and a computing circuit responsive to orthogonal first and second electric signals from said geomagnetic field sensor to compute a heading of said moving object and generate a heading signal, the improvement wherein said computing circuit comprises:

means for repeatedly during operation of said apparatus eliminating instantaneous abnormal values of first and second output values (X', Y') respectively proportional to said orthogonal first and second electric signals (X, Y) from said geomagnetic field sensor;

means for repeatedly during operation of said apparatus computing and storing offset values (Xo, Yo) for said orthogonal first and second electric signals from said geomagnetic field sensor when said first and second values (X', Y') satisfy a predetermined condition after the elimination of the abnormal values thereof; and means for repeatedly during operation of said apparatus correcting said first and second electric signals (X, Y) from said geomagnetic field sensor having the abnormal values thereof eliminated in accordance with said first and second offset values (Xo, Yo) respectively to derive said first and second values for computing the heading signal of said moving object therefrom.

6. An apparatus according to claim 5, wherein said elimination means comprises:

computing means for computing said first output value (X') by subtracting said first offset value (Xo) from said first signal (X) of said geomagnetic field sensor and said second output value (Y') by subtracting said second offset value (Yo) from said second signal (Y) of said geomagnetic field sensor;

decision means for determining whether a value representing the square root of the sum of the squares of said first and second output values (X', Y') is within a predetermined range of values; and holding means whereby when said square root departs from said range, a heading obtained just before said departure is maintained.

7. In a heading detecting apparatus attached to a moveing object and comprising a geomagnetic field sensor for detecting the direction of the earth's magnetic field in terms of orthogonal first and second signals and a computing circuit responsive to orthogonal first and second electric signals to compute a heading of said moving object and generate a heading signal, the improvement wherein said computing circuit comprises:

means for repeatedly during operation of said apparatus computing and storing first and second offset values (Xo, Yo) of a circular vector locus of said orthogonal first and second electric signals (X, Y) from said geomagnetic field sensor in accordance with arbitrary three sets of first and second output values (X', Y') respectively proportional to said first and second electric signals; and means for repeatedly during operation of said apparatus correcting said orthogonal first and second electric signals (X, Y) from said geomagnetic field sensor in accordance with said offset values (Xo, Yo).

8. An apparatus according to claim 7, wherein said computing and storing means comprises: first computing means for computing said first output value (X') by subtracting said first outset value (Xo) from said first electric signal output value (X) of said geomagnetic field sensor; and second computing means for computing said second output value (Y') by subtracting said second offset value (Yo) from said second electric signal output value (Y) of said geomagnetic field sensor, and wherein said correcting means comprises signal generating means for obtaining a tangent of said first and second output values to generate a heading angle signal.

9. An apparatus according to claim 8, wherein said computing and storing means is enabled only when the speed of said moving object is higher than a predetermined speed and the difference between said heading angle and a predetermined heading angle is greater than a predetermined value.

* * * * *